United States Patent [19]

Wagner

[11] 4,238,165

[45] Dec. 9, 1980

[54] FASTENER UNIT FOR CLAMPING PLASTIC WORKPIECES

[75] Inventor: David P. Wagner, Geneva, Ill.

[73] Assignee: Illinois Tool Works Inc., Chicago, Ill.

[21] Appl. No.: 6,956

[22] Filed: Jan. 25, 1979

[51] Int. Cl.³ .......................... F16B 5/02; F16B 43/00
[52] U.S. Cl. ........................................ 403/408; 85/41; 85/50 R; 151/37
[58] Field of Search ................ 85/41, 50 R, 9 R, 1 R; 151/37, 38, 35; 10/10 R, 27 R, 155 R; 403/408, 405

[56] References Cited

U.S. PATENT DOCUMENTS

| | | | |
|---|---|---|---|
| 1,674,258 | 6/1928 | Obergfell et al. | 85/9 R X |
| 1,809,758 | 6/1931 | Rosenberg | 85/41 |
| 2,076,041 | 4/1937 | Payne | 85/41 |
| 2,275,315 | 3/1942 | Ray | 85/50 R |
| 2,779,376 | 1/1957 | Poupitch | 151/38 X |
| 3,016,941 | 1/1962 | Coldren | 151/38 |
| 3,286,579 | 11/1966 | Lovisek | 85/41 |
| 3,315,720 | 4/1967 | Gutshall | 151/38 |
| 4,193,434 | 3/1980 | Wagner | 151/38 |

FOREIGN PATENT DOCUMENTS

| | | | |
|---|---|---|---|
| 482976 | 3/1974 | Australia | 85/41 |
| 1103831 | 6/1955 | France | 85/41 |
| 991961 | 5/1965 | United Kingdom | 85/9 R |
| 1159640 | 7/1969 | United Kingdom | 85/9 R |
| 404965 | 3/1974 | U.S.S.R. | 151/37 |

*Primary Examiner*—Ramon S. Britts
*Attorney, Agent, or Firm*—Thomas W. Buckman; Richard K. Thomson

[57] ABSTRACT

A fastener unit for clamping plastic material having a first predetermined thickness to a relatively thin sheet metal support having a second predetermined thickness. The fastener unit includes a spacer collar having a length substantially equal to the first predetermined thickness, the plastic having a hole to receive the collar. The collar surrounds the upper portion of a threaded shank and the end abuts the sheet metal. The spacer collar has an internal diameter which forms a gap with the threads of a size approximately equal to the second predetermined thickness. As the fastener is threadingly advanced into the sheet metal, the end of the collar serves as a fulcrum about which the threads bend the material which forms the edge of the hole into the gap increasing the stripping torque of the fastener unit.

7 Claims, 4 Drawing Figures

FASTENER UNIT FOR CLAMPING PLASTIC WORKPIECES

BACKGROUND AND SUMMARY OF THE INVENTION

This application is related to U.S. patent application Ser. No. 932,744, filed Aug. 10, 1978.

Plastics are finding wider and wider areas of application due to their light-weight, high-strength characteristics. With these advantages plastics bring certain problems. More specifically, due to the tendency of plastic materials to cold flow under load, clamping and fastening the plastic members by conventional methods becomes impossible. This is because standard screws and bolts depend on pressure from the joint to prevent fastener back off and loosening of the joint. When the plastic cold flows, it relieves the joint pressure leaving the fastener free to vibrate out of the joint.

A further problem arises when these plastic members are fastened to a relatively thin sheet metal support. Because of the thinness of the material, there are only a few threads of the fastener engaged with the workpiece. Hence the stripping torque (that is, the amount of rotational force necessary to ream the threads out of the workpiece) is relatively low. The higher the stripping torque, the greater the resistance to fastener back off. Thus the problem of fastening plastic materials becomes most accute when fastening them to thin sheet metal.

The thinness of the metal forming the support creates a third related problem. The drive torque (or amount of rotation force necessary to insert the fastener) will vary depending on such parameters as the local hardness of the sheet metal, the hardness of the fastener threads and the angle of fastener insertion, among others. The workman would like to select a torque for the power driver which (1) will insure every fastener will be driven (2) without over-torquing or stripping any. Due to the low stripping torque in the thin metal, the workman has a very narrow range of torques, if any, which will permit both requirements to be satisfied.

It is an object of the present invention to provide a fastener unit capable of fastening plastic to thin sheet metal which, in operation, will have a greatly increased stripping torque inspite of the characteristics of the plastic and the sheet metal. This will enhance the capabilities of the unit as a fastener and facilitate its use by enlarging the range of torques with which it may satisfactorily be driven.

These and other objects of the invention are accomplished by a self-tapping fastener which is assembled with a spacer to form a unit. The spacer is a cylindrical collar which has a predetermined length corresponding to the thickness of the plastic material and an inside diameter which exceeds the thread crest diameter of the fastener by approximately twice the thickness of the sheet metal workpiece. The spacer permits the upper surface of the plastic to be lightly clamped by a material-engaging means which may be on the lower side of the head of the fastener or a flange on the spacer. A portion of the edge region of the hole in the workpiece which surrounds the shank of the fastener will be extruded into the gap between the spacer and the thread crests greatly increasing the stripping torque.

DETAILED DESCRIPTION OF THE PREFERRED EMBODIMENTS

Figure 1:
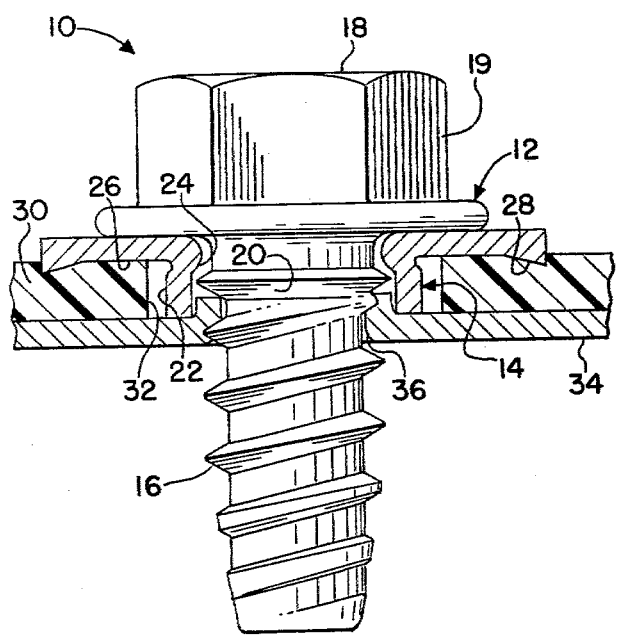
FIG. 1 is a side view of the fastener unit in partial section shown securing a plastic member to a thin sheet metal support.

The fastener unit of the present invention is depicted generally at 10 in FIG. 1. The unit consists of a self-tapping fastener 12 and a spacer means 14. The fastener has a threaded shank portion 16 and a laterally extending head 18 which includes drive-receiving surface means 19. The shank 16 has an annular enlargement or ridge 20 at the upper extremity of the threads. The spacer means includes an axially extending collar portion 22. The upper periphery of the collar includes at least one inwardly directed projection 24 which may take the form of an annulus. The inside diameter of the projection is less than the outside diameter of ridge 20 such that the spacer may be snapped over the ridge and the spacer and fastener coupled together as a unit.

The unit includes a material-engaging means 26 which in this embodiment takes the form of a laterally extending flange. The flange may be provided with a plurality of spur teeth 28. These teeth will engage and penetrate into plastic member 30 preventing relative movement between the plastic member and the spacer. The axial length of spacer collar 22 approximates the thickness of plastic member 30. The collar is received in an enlarged hole 32 in member 30 and the end of the collar abuts sheet metal support 34. This permits material-engaging means 26 to lightly clamp the plastic member as threaded shank 16 taps and advances into hole 36 in support, thereby avoiding large, undesirable amounts of cold flow.

Collar 22 has a diameter which is related to the particular fastener diameter with which it is to be used. More specifically, the inside diameter of the collar exceeds the outside diameter of the thread crests by approximately twice the thickness of the sheet metal 34 with which the fastener is to be used. This size relationship creates a gap between the collar and the thread crests extending about the shank of the fastener. It is important that the threads extend upwardly into the collar for reasons which will become clear below.

In operation, the aperture 32 in the plastic member is positioned above the hole 36 in the sheet metal and the fastener member 10 positioned adjacent to the hole. A power tool (not shown) is brought into engagement with the drive surfaces 19 to advance the fastener into the workpiece. The initial threads which may be tapered, partial or slotted to facilitate threat-cutting, engage in the hole 36 and form the threads therein. As the fastener unit advances the collar 22 of the spacer is received in aperture 32 in the plastic member and bottoms against sheet metal support 34.

As the fastener unit is tightened down and the point is reached where the fastener would ordinarily begin to strip the threads in the workpiece, the end of the spacer serves as a reaction surface for the bending of the edges of the hole 36 upwardly into the collar. This material tends to be extruded upwardly into the gap greatly increasing the stripping torque. This benefit results because the extruded material becomes threaded, greatly increasing the thread engagement in the material and because the material tends to jam between the shank and the collar resisting further rotational movement.

Figure 2:
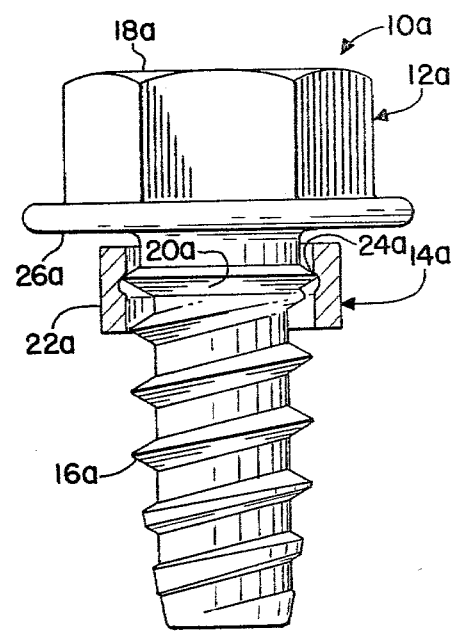
FIG. 2 is a side view in partial section of an alternate embodiment in which the lower surface of the head of the fastener is the material-engaging surface.
Figure 3:
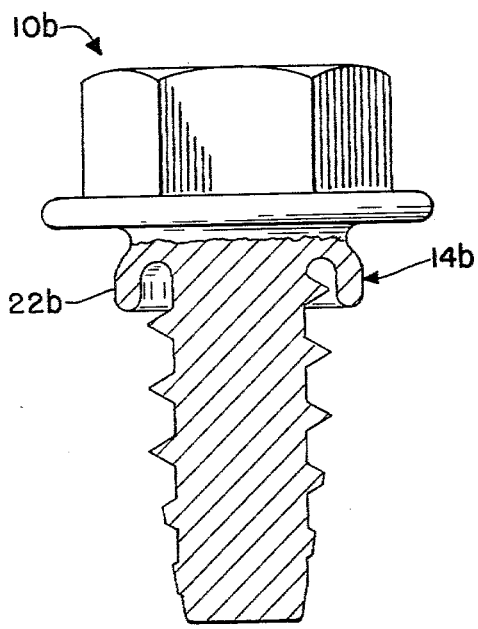
FIG. 3 is a side view in partial section of another alternate embodiment in which the spacer is formed integrally with the fastener.
Figure 4:
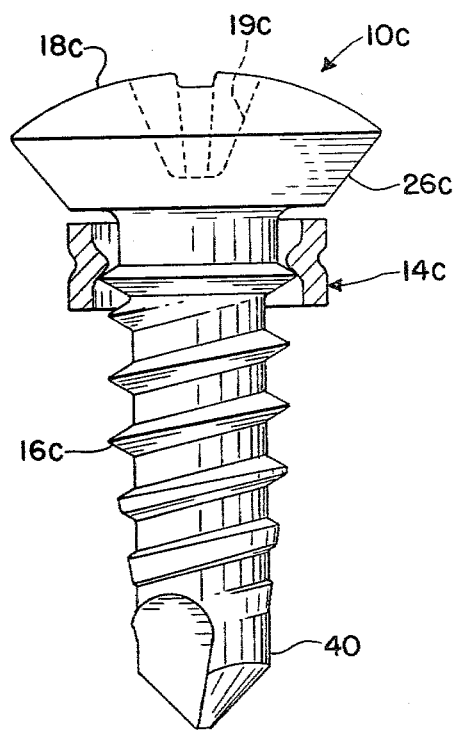
FIG. 4 is a side view in partial section of yet a fourth embodiment in which the fastener has a self-drilling tip and a frustoconical head.

FIGS. 2–4 shows various alternate embodiments in which like reference numerals indicate like elements with the additional reference characters a, b and c for the respective figure.

In the embodiment of FIG. 2, spacer 14a takes the form of a cylindrical collar 22a. The material-engaging means 26a is formed on the lower surface of head portion 18a of fastener 12a. The spacer is, again, assembled as a unit with the fastener by means of a ridge 20a and projection 24a as has been described with reference to the FIG. 1 embodiment.

In the embodiment shown in FIG. 3, the spacer 14b of fastener unit 10b is made integrally with the shank of the fastener unit. In practice, the unit 10b will be formed with a large cylindrical block of material beneath the head. After the shank has been thread rolled, collar 22b will be formed by extruding the material forming the block downwardly to surround the threaded shank by a second thread-rolling step. The size of the block in conjunction with the spacing of the dies will determine the diameter and axial extent of the collar.

FIG. 4 depicts a fourth embodiment in which the fastener unit 10c has a drill point 40 below the threaded shank 16c. The spacer 14c is similar to that shown in FIG. 2, and as in that embodiment the material-engaging means 26c is formed as part of the fastener head. In this embodiment the head portion 18c has an internal drive surface 19c and has a generally frustoconical configuration. The minor diameter of the head is approximately equal to the outside diameter of spacer 14c with the frustoconic 26c extending outwardly and upwardly therefrom. The tapering head 26c will slightly compress the plastic material downwardly and outwardly. It will be understood that any of the above embodiments may be provided with a drill tip 40 obviating the need to pre-drill the support.

Tests were run using a unit of the type shown in FIG. 1 with a drill point being tested against the same fastener provided with only a flat washer fastened above the threaded region. These test were run in 0.100 inch (2.54 mm) and 0.125 inch (3.17 mm) plastic material and 0.031 inch (0.79 mm) sheet metal using the same driver under identical laboratory conditions. The results are shown in Table I.

TABLE I

| Material Thickness (Inches) | Flat Washer | | Spacer Collar | |
|---|---|---|---|---|
| | Drive Torque (In. - Lb.) | Strip Torque (In. - Lb.) | Drive Torque (In. - Lb.) | Strip Torque (In. - Lb.) |
| .100 | 8 | 15 | 6 | 24 |
| | 5.5 | 16.5 | 6 | 23 |
| | 7 | 13 | 5.5 | 27 |
| | 8 | 16 | 6 | 28 |
| | 6.5 | 13.5 | 8 | 31.5 |
| .125 | 6 | 18.5 | 7 | 31 |
| | 6 | 18 | 7 | 32 |
| | 6 | 12.5 | 7 | 28.5 |
| | 7 | 16.5 | 8 | 34 |
| | 6.5 | 18.5 | 6.5 | 28 |

As can be seen from the Table, a narrow range of torques, 8–12.5 inch-pounds, is available in which to drive the fasteners with the flat washers without stripping. The range may, in fact, be narrower or non-existent (i.e., some drive torques being higher than the stripping torque for a different fastener) when a larger sample is taken.

The present invention increases the average stripping torque in excess of 80% in both thicknesses of material, greatly enhancing the fastening capabilities of the unit, reducing the likelihood of back off and increasing the range of torques which may safely be used to apply the fastener units.

While for purposes of illustrating the applicant's invention certain embodiments have been disclosed and described herein, it should be understood that the invention contemplates various changes and modifications without departing from the spirit and scope of the appended claims.

I claim:

1. A fastener unit in combination with plastic material of a first predetermined thickness and a support of relatively thin sheet metal having a second predetermined thickness, said unit comprising a self-tapping fastener having a shank portion which has threads whose crests define an outside diameter, a laterally extending head portion having a drivable means on an upper region thereof, a laterally extending material-engaging means engaging an outward surface of said plastic material, an axially extending, generally cylindrical spacer means having an axial length substantially equal to said first predetermined thickness, said spacer means having an axial extent greater than the distance from the underside of said head to the thread convolution nearest thereto and, in operative engagement, surrounding a portion of the threaded shank, said spacer means having an inside diameter substantially equal to the outside diameter of said thread crests plus twice said second predetermined thickness, said spacer means being received in an aperture in said plastic material thereby engaging said sheet metal and permitting the material-engaging means to lightly clamp said plastic material, whereby as the fastener is threadingly advanced into the sheet metal, at least a portion of said sheet metal surrounding the threads is extruded upwardly into the gap between said spacer and said thread crests greatly increasing said stripping torque.

2. The fastener unit of claim 1 wherein the laterally extending material-engaging means comprises the underside of the fastener head portion.

3. The fastener unit of claim 1 wherein the laterally extending material-engaging means comprises an outwardly extending flange portion of said spacer means.

4. The fastener unit of claim 1 wherein said spacer means is formed integrally with said fastener.

5. The fastener unit of claim 1 wherein the spacer means comprises a separate washer means whose inner diameter has at least one inwardly directed projection which engages over an annular ridge on said fastener shank to retain said spacer thereon.

6. A fastener unit in combination with plastic material of a first predetermined thickness and a support of relatively thin sheet metal having a second predetermined thickness, said unit comprising a self-tapping fastener having a shank portion which has threads whose crests define an outside diameter, a laterally extending head having a drivable means on an upper region thereof, a portion of said head having a frustoconical configuration, a generally laterally extending material-engaging means engaging a portion of said plastic material, and material-engaging means comprising the frustoconical portion of the head, an axially extending, generally cylindrical spacer means having an axial extent greater than the distance from the underside of the head to the thread convolution nearest thereto, said first predetermined thickness being greater than the length of said spacer means but no greater than the combined length of the spacer plus the axial height of the frustoconical portion of the head, the spacer having an inside diameter substantially equal to the outside diameter of said thread crests plus twice said second predetermined thickness, said spacer means being received in an aperture in said plastic material thereby engaging said sheet metal and permitting the frustoconical head portion to lightly clamp said plastic material whereby, as the fastener is threadingly advance into the sheet metal, at least a portion of said sheet metal surrounding the threads is extruded upwardly into the gap between said spacer and said thread crests, greatly increasing said stripping torque.

7. A fastener unit in combination with plastic material of a first predetermined thickness and a support of relatively thin sheet metal having a second predetermined thickness, said unit comprising a self-tapping fastener having a shank portion which has threads whose crests define an outside diameter and a laterally extending head portion which has a drivable means on an upper region thereof; a laterally extending material-engaging means engaging an outward surface of said plastic material an annular spacer means having an axial length substantially equal to the first predetermined thickness, said spacer means having an axial extent greater than the distance from the underside of the head to the thread convolution nearest thereto and, in operative engagement, surrounding a portion of the threaded shank at least the region of said spacer means nearest said thread convolution having an inside diameter substantially equal to the outside diameter of said thread crests plus twice said second predetermined thickness, said spacer means being received in an aperture in said plastic material thereby engaging said sheet metal and permitting the material-engaging means to lightly clamp said plastic material whereby, as the fastener is threadingly advanced into the sheet metal, at least a portion of said sheet metal surrounding the threads is extruded upwardly into the gap between said spacer and said thread crests greatly increasing said stripping torque.

* * * * *